United States Patent [19]
Mills

[11] Patent Number: 5,293,734
[45] Date of Patent: Mar. 15, 1994

[54] BOTTOM BLADE FOR GRASS CUTTING UNIT AND METHOD OF PRODUCING

[75] Inventor: John Mills, Trimley St Mary, England

[73] Assignee: Ransomes Sims & Jefferies Limited, Suffolk, England

[21] Appl. No.: 838,269

[22] PCT Filed: Aug. 2, 1990

[86] PCT No.: PCT/GB90/01206
§ 371 Date: May 13, 1992
§ 102(e) Date: May 13, 1992

[87] PCT Pub. No.: WO91/03923
PCT Pub. Date: Apr. 4, 1991

[30] Foreign Application Priority Data
Sep. 15, 1989 [GB] United Kingdom ............... 8920955

[51] Int. Cl.⁵ .............................................. A01D 34/52
[52] U.S. Cl. ........................................ 56/249; 29/891; 56/294; 56/DIG. 20
[58] Field of Search ............... 56/249, 250, 251, 294, 56/Dig. 20; 241/197; 76/101.1; 29/891

[56] References Cited

U.S. PATENT DOCUMENTS

| | | | |
|---|---|---|---|
| 1,348,471 | 8/1920 | Aspinwall | 56/294 |
| 1,355,509 | 12/1919 | Ross | 56/294 |
| 2,045,386 | 6/1936 | Gottschalk | 56/294 |
| 2,183,545 | 12/1939 | Clemson | 56/294 |
| 2,557,897 | 6/1951 | Sullivan | 56/289 |
| 2,583,543 | 1/1952 | Boyce et al. | 56/249 |
| 3,635,271 | 1/1972 | Markham | 56/250 X |
| 3,805,660 | 4/1974 | Burrough | 83/658 |

FOREIGN PATENT DOCUMENTS

615078  12/1948  United Kingdom .

*Primary Examiner*—David J. Bagnell
*Attorney, Agent, or Firm*—Birch, Stewart, Kolasch & Birch

[57] ABSTRACT

A bottom blade for a grass cutting unit is formed by bending a low carbon steel mounting plate to form a lip; welding to the lip a thin wear strip of high carbon steel and further bending the mounting plate to produce the required lip height.

8 Claims, 3 Drawing Sheets

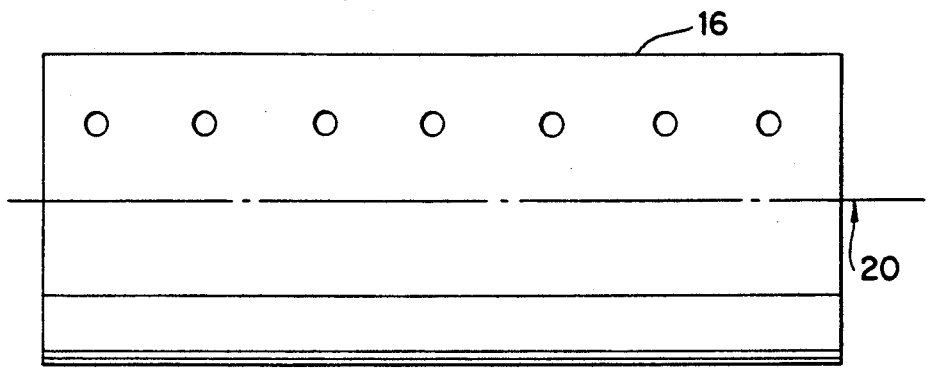
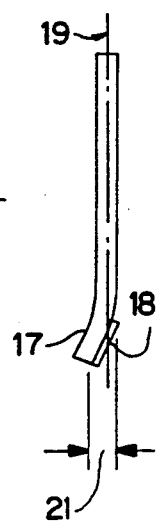
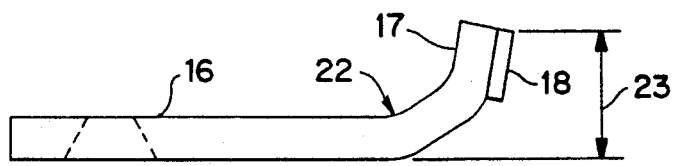
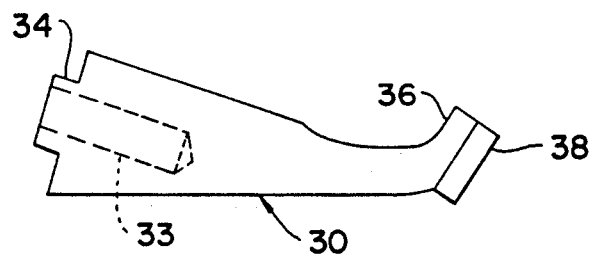
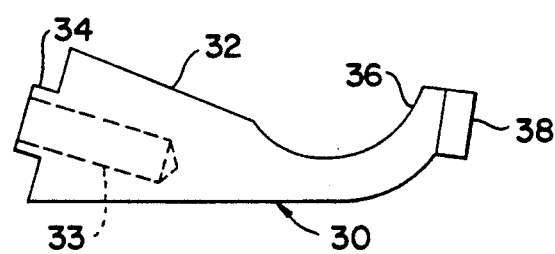

BOTTOM BLADE FOR GRASS CUTTING UNIT AND METHOD OF PRODUCING

BACKGROUND OF THE INVENTION

This invention relates to bottom blades for the type of grass cutting unit that has a rotating cutting reel.

These bottom blades are subject to high wear rates because of the almost continuous engagement with the rotating cutting reel over extended periods of use. Friction, particularly where the cutting reel is not correctly adjusted, can lead to thermal distortion of the bottom blade, this distortion in some cases becoming permanent.

SUMMARY OF THE INVENTION

It is an object of this invention to provide an inexpensive method of producing an improved bottom blade which has a low wear rate, and less susceptibility to thermal distortion.

Accordingly, the present invention consists in a method of producing a bottom blade for a grass cutting unit, comprising the steps of forming an elongate mounting element of relatively low hardness; welding thereto an elongate wear strip of relatively high hardness, the wear strip being positioned with an elongate edge thereof substantially aligned with an elongate edge of the mounting element and, subsequent to said welding step, forming a bend in the mounting element along a bend line parallel to the length of the strip.

Preferably, the wear strip undergoes a hardening step before said welding step.

Suitably, said welding step comprises an electron beam welding process.

Advantageously, the step of forming the elongate mounting portion includes a bending step to produce an inclined lip, the welding step comprising the welding of the wear strip to said lip and the subsequent bending step serving to increase the inclination of said lip relative to the body of the mounting portion.

In a bottom blade according to this invention, the elongate plate of the bottom blade need not be formed of hardenable material and can, for example, be formed of an inexpensive mild steel. The material for the wear strip can be chosen to optimize the wear and thermal properties, without regard to factors such as the expense of producing an entire bottom blade out of the material or the toughness required in the mounting portion of the bottom blade. Thus, the wear strip can in one example be formed of high speed steel which retains its properties at elevated temperatures.

BRIEF DESCRIPTION OF THE DRAWINGS

The invention will now be described by way of example with reference to the accompanying drawings in which:

FIGS. 8 and 9 are respectively plan and end views of a modified bottom blade according to this invention at an intermediate stage in manufacture;

FIG. 10 is an end view of the bottom blade shown in FIGS. 8 and 9, in its final form; and FIGS. 11 and 12 are end views of a further modified bottom blade according to this invention at intermediate and final stages of manufacture, respectively.

DETAILED DESCRIPTION OF THE PREFERRED EMBODIMENTS

Figure 1:
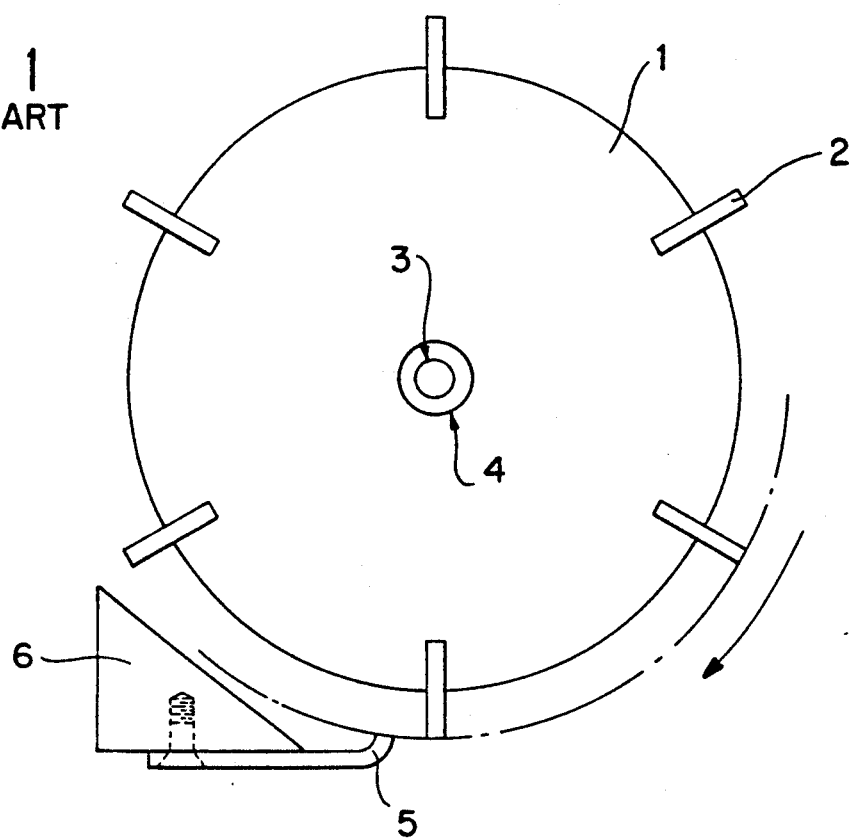
FIG. 1 is an illustration of a conventional bottom blade in use.

FIG. 1 illustrates a conventional grass cutting unit having a cutting reel 1 with a series of blades 2 arranged about a shaft 3 which is rotatably mounted in bearings 4. A bottom blade 5 is attached to a bottom block 6 and cooperates with the rotating blades to shear or cut grass. The bearings 4 and the bottom block 6 are mounted in the cutting unit so that the relative orientation of the rotating blades 2 and the bottom blade 5 can be adjusted and accurately maintained.

Figure 2:
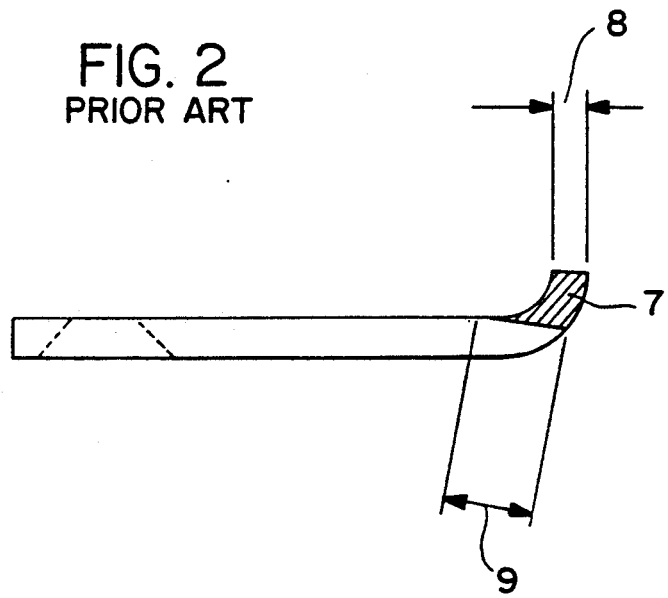
FIG. 2 is an end view of a conventional bottom blade.

A conventional bottom blade is normally made from a high carbon alloy steel. Referring to FIG. 2, the lip portion 9 is generally induction hardened to provide a wear resistant cutting edge. Through the inclination of the lip to the body of the blade, an edge 8 is presented to the cutting reel with the thickness at this point being in the circumferential direction of the reel.

It is to be expected in use that the portion 7 of the blade which is shown shaded, will wear away. During this wear, it will be appreciated that the cutting land width offered to the cutting reel will gradually increase, the amount of the increase being greatest as the blade reaches the end of its useful life. The cutting land width is an important parameter since it influences the power required to rotate the cutting reel. The cutting land width should ideally be small and should not increase during use.

Figure 3:
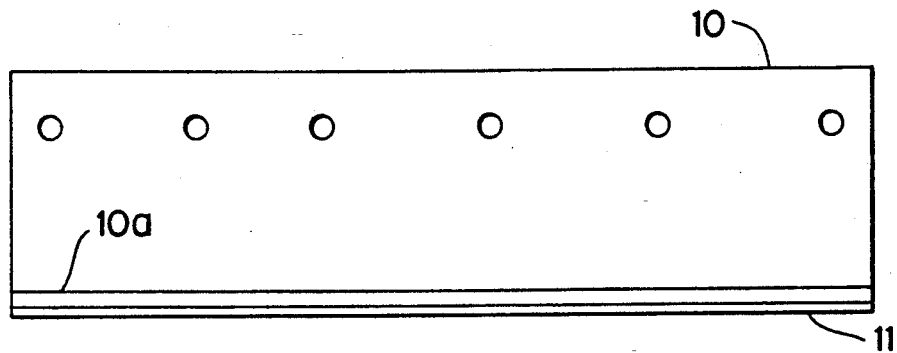
FIGS. 3, 4 and 5 are respectively plan, front and side views of a bottom blade produced according to this invention.
Figure 4:
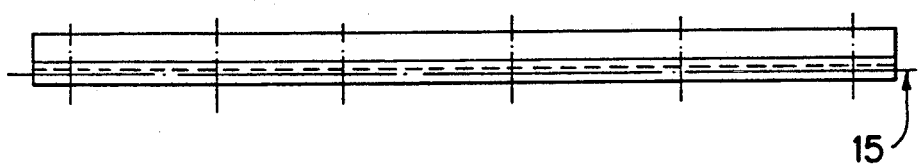
Figure 5:
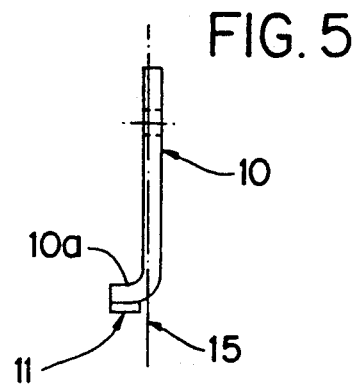

Referring now to FIGS. 3, 4, and 5, there is shown an improved bottom blade according to this invention. The bottom blade comprises a mounting plate 10 which is of generally the same shape as a conventional bottom blade. This mounting portion is, however, formed from a relatively soft metal such as low carbon mild steel. As will be described in more detail hereafter, the mounting portion is bent to form a lip 10a. There is attached to this lip a relatively thin wear strip 11. This wear strip is formed, in one example, from high speed steel and is preferably secured to the mounting portion by electron beam welding.

It will be recognized that removing the need to produce the entire bottom blade of a hardenable metal introduces a cost saving. The wear strip can, moreover, be hardened prior to welding to the mounting plate, thus avoiding the energy costs of heating a relatively large body of metal.

Figure 6:
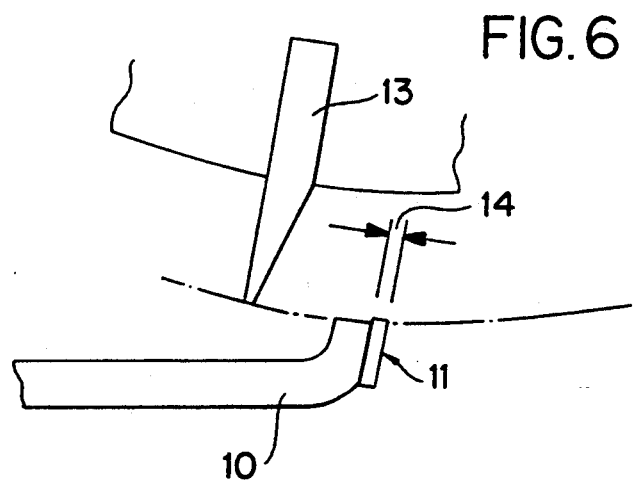
FIG. 6 illustrates a bottom blade according to this invention in use.

As illustrated in FIG. 6, the bottom blade according to this invention provides a relatively small cutting land width which remains constant during wear. The relatively soft metal of the mounting portion 10 will quickly abrade through engagement with the cutting blades 13 to leave a relatively narrow cutting land width 14 defined by the wear strip 11. As wear progresses, the wear strip will continue to project beyond the mounting portion, so that there is no increase in the cutting land width.

Figure 7:
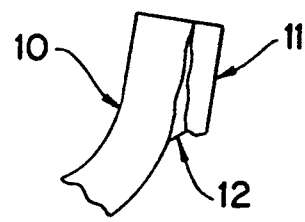
FIG. 7 is a scrap view illustrating a feature of the construction of the bottom blade according to this invention.

To maximize the lift of a bottom blade according to this invention, the welding process is preferably conducted from the underside to leave a weld pool 12, as shown in FIG. 7, which extends beyond the wear piece in the direction radially outwardly of the cutting reel. It will be seen that the wear strip remains attached to the mounting plate until the wear strip is completely worn away.

The problem of thermal distortion of the bottom blade has been mentioned above and will now be described in more detail. If the cylinder is adjusted too tightly against the bottom blade, friction will cause the temperature of the bottom blade to increase, especially in sparse, dry grass conditions or at times when the blades are rotating without cutting grass. It is found that this rise in temperature has the effect of distorting the lip of the bottom blade upwards, that is to say towards the rotating cylinder reel, with the effect of increasing the temperature still further. When a critical temperature is exceeded, conventional bottom blades have been found to undergo a permanent deformation. At a bottom blade of high carbon alloy steel cools from such an elevated temperature to ambient, a volumetric change takes place within the lip area. This has the effect of bowing the bottom blade, with the displacement away from the cutting cylinder being at a maximum towards the middle of the bottom blade. It will be appreciated that once such bowing has taken place, it is impossible to adjust the cutting reel to provide optimum cutting performance across the width of the reel.

In a bottom blade according to the present invention, the relatively soft material employed for the mounting portion of the blade is found not to undergo permanent deformation on heating. The material of the wear strip can be selected to give increased resistance to this deformation effect. Thus, high speed steel can be used which is found to resist deformation up to critical temperatures which are substantially in excess of the critical temperatures for the high carbon alloy steels used conventionally for bottom blades.

A method of manufacturing a bottom blade according to this invention will now be described with reference to FIGS. 8, 9 and 10.

A mounting plate 16 is formed with a lip 17, the angle between the lip and the body of the mounting plate being significantly less than that required in the finished blade. This has the effect that when the wear strip 18 is subsequently welded to the mounting plate, the region of the mounting plate which is heated lies substantially on the neutral axis 19. Distortion about said axis is therefore minimized and a wear strip can be used which has been hardened prior to the welding operation without the difficulty of having to straighten a relatively brittle wear strip after welding.

Referring to FIG. 10, the bottom blade undergoes a subsequent bending operation at 22 to provide the required lip height 23. During this bending step, the bottom blade is held straight about the axis 20. Any distortion that has occurred during welding about the axis 20 is reduced due to the restraining forces of residual stresses created during this bending process. Thus by arranging that major distortion occurs only about the axis 20 and then by forming a bend parallel to that axis, the problem normally to be expected in welding a wear strip to a bottom blade is overcome or substantially so.

An alternative form of bottom blade is disclosed and claimed in International Published Patent Application No. WO90/13220 and the method of the present invention can usefully be employed to produce a bottom blade of that alternative form.

Thus, as shown in FIG. 11, an elongate mounting element 30 has a thickened portion 32 shaped to provide a longitudinal flange 34. This flange engages, in use, a recess in the bottom block of the grass cutting unit with screws passing through the block and into blind apertures 33 in the mounting element 30 to hold it in place.

It will be seen that, opposing the thickened portion 32, the mounting element has an inclined lip 36. The hardened wear strip 38 is electron beam welded to this lip 36 to produce the intermediate component shown in FIG. 11. Subsequently, the mounting element undergoes a further bending step to increase further the inclination of the lip 36 and produce the final form of the bottom blade as shown in FIG. 12.

It should be understood that this invention has been described by way of examples only and a variety of modifications can be made without departing from the scope of the invention. Thus, the materials referred to specifically are but examples of a range of materials that will occur to the skilled man.

I claim:

1. A method of producing a bottom blade for a grass cutting unit, comprising the steps of forming an elongate mounting element of relatively low hardness; welding thereto an elongate wear strip of relatively high hardness, the wear strip being positioned with an elongate edge thereof substantially aligned with an elongate edge of the mounting element; and, subsequent to said welding step, forming a bend in the mounting element, along a bend line parallel to the length of the strip.

2. A method according to claim 1, comprising the further step, prior to said welding step, of hardening said elongate wear strip.

3. A method according to claim 1 or claim 2, wherein the step of forming an elongate mounting elements includes a bending step to produce a lip inclined about a longitudinal axis, wherein said welding step comprises the welding of said elongate wear strip to said lip and wherein the subsequent bending step serves to increase the inclination of said lip about the longitudinal axis.

4. A method according to claim 1, wherein the elongate mounting element is formed of relatively low carbon steel and the elongate wear strip is formed of relatively high carbon steel.

5. A method according to claim 1, wherein the welding step comprises an electron beam welding process.

6. A bottom blade for a grass cutting unit produced by forming an elongate mounting element of relatively low hardness; welding thereto an elongate wear strip of relatively high hardness, the wear strip being positioned with an elongate edge thereof substantially aligned with an elongate edge of the mounting element; and, subsequent to said welding step, forming a bend in the mounting element along a bend line parallel to the length of the strip.

7. A bottom blade for a grass cutting unit produced by forming an elongate mounting element of relatively low hardness; conducting a bending step to produce in said element a lip inclined about a longitudinal axis; welding to said lip an elongate wear strip of relatively high hardness, the wear strip being positioned with an elongate edge thereof substantially aligned with an elongate edge of the mounting element, and, subsequent to said welding step, forming a bend in the mounting element which serves to increase the inclination of said lip about said longitudinal axis.

8. A bottom blade according to claim 6 or claim 7 wherein the elongate mounting element is formed of relatively low carbon steel and the elongate wear strip is formed of relatively high carbon steel.

* * * * *